(12) United States Patent
Turlikov et al.

(10) Patent No.: US 9,105,074 B2
(45) Date of Patent: Aug. 11, 2015

(54) SCALABLE COMPRESSION USING JPEG-LS

(75) Inventors: Andrey Mikhailovich Turlikov, St. Petersburg (RU); Anton Valerievich Sergeev, St. Petersburg (RU); Anna Sergeyevna Ukhanova, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 13/504,572

(22) PCT Filed: Oct. 27, 2009

(86) PCT No.: PCT/RU2009/000578
§ 371 (c)(1),
(2), (4) Date: Oct. 15, 2012

(87) PCT Pub. No.: WO2011/053178
PCT Pub. Date: May 5, 2011

(65) Prior Publication Data
US 2013/0142446 A1 Jun. 6, 2013

(51) Int. Cl.
*G06K 9/36* (2006.01)
*G06T 9/00* (2006.01)
*H04N 21/2343* (2011.01)
(Continued)

(52) U.S. Cl.
CPC *G06T 9/00* (2013.01); *H04N 19/36* (2014.11); *H04N 21/234327* (2013.01); *H04N 21/440227* (2013.01)

(58) Field of Classification Search
None
See application file for complete search history.

(56) References Cited

U.S. PATENT DOCUMENTS

| 6,427,029 B1 * | 7/2002 | Kono et al. ............ 382/248 |
| 7,148,996 B2 * | 12/2006 | Yeo et al. ............ 358/1.9 |
| 2002/0067518 A1 * | 6/2002 | Benz et al. ............ 358/518 |

FOREIGN PATENT DOCUMENTS

| KR | 10-2009-0040294 A | 4/2009 |
| WO | 02/071622 A2 | 9/2002 |

(Continued)

OTHER PUBLICATIONS

International Search Report and Written Opinin received for PCT Patent Application No. PCT/RU2009/000578, mailed on Aug. 24, 2010, 15 pages.

(Continued)

*Primary Examiner* — Chan Park
*Assistant Examiner* — Eueng-Nan Yeh
(74) *Attorney, Agent, or Firm* — Douglas J. Ryder; Ryder, Lu, Mazzeo & Konieczny LLC

(57) ABSTRACT

A global bit stream comprising at least a first and a second bit stream is generated using an original visual bit stream. The first bit stream is generated by compressing the original visual bit stream using a JPEG-LS compression technique with a lossy factor 'n'. The second bit stream is generated by compressing a difference bit stream using a JPEG-LS lossless compression technique, wherein the difference bit stream comprises a difference between the original visual bit stream and the first bit stream. The visual display is recreated using a reconstructed bit stream after receiving the global bit stream over a channel, wherein the reconstructed bit stream is generated by decompressing at least the first bit stream using a JPEG-LS lossless compression technique. The second bit stream is decompressed using JPEG-LS lossless compression technique and the quality of the display may be enhanced by adding the decompressed second bit stream.

21 Claims, 6 Drawing Sheets

(51) Int. Cl.
*H04N 21/4402* (2011.01)
*H04N 19/36* (2014.01)

(56) References Cited

FOREIGN PATENT DOCUMENTS

| WO | 2004/080080 A1 | 9/2004 |
|---|---|---|
| WO | 2008/009564 A1 | 1/2008 |
| WO | 2011/053178 A1 | 5/2011 |

OTHER PUBLICATIONS

Menon et al., "Simple method for enhancing the performance of lossy plus lossless image compression schemes", Journal of Electronic Imaging. SPIE / IS & T, vol. 2, No. 3, Jul. 1, 1993, pp. 245-252.

"Lossless and near-lossless coding of continuous tone still images (JPEG-LS)", ISO/IEC JTC1/SC29/WG1 FCD 14495—public draft, Jul. 16, 1997, 79 pages.

Huang et al., "Algorithm and architecture design of multi-layer video coding engine with hybrid scheme for wireless video links" Multimedia and Expo, 2009. ICME 2009. International Conference on, IEEE, Piscataway, NJ, USA, Jun. 28, 2009, pp. 197-200.

Avcibas et al., "A Successively Refinable Lossless Image-Coding Algorithm" IEEE Transactions on Communications, IEEE Service Center, Piscataway, NJ, vol. 53, No. 3, Mar. 1, 2005, pp. 445-452.

Office Action received for Korean Patent Application No. 2012-7013516, mailed on Jul. 30, 2013, 4 pages of English Translation only.

Office Action received for Korean Patent Application No. 2012-7013516, mailed on Jun. 17, 2014, 2 pages of English Translation only.

International Preliminary Report on Patentability and Written Opinion received for PCT Patent Application No. PCT/RU2009/000578, mailed on May 10, 2012, 8 pages.

\* cited by examiner

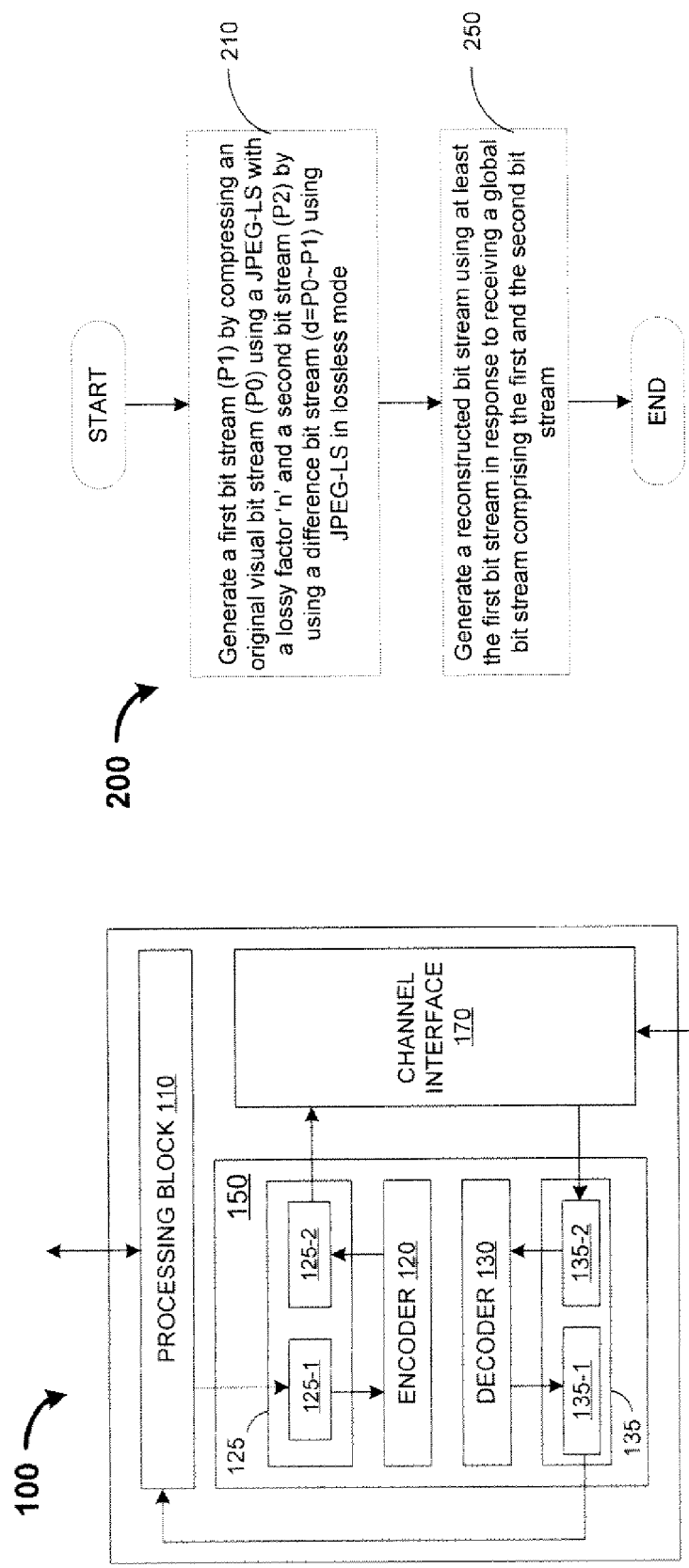

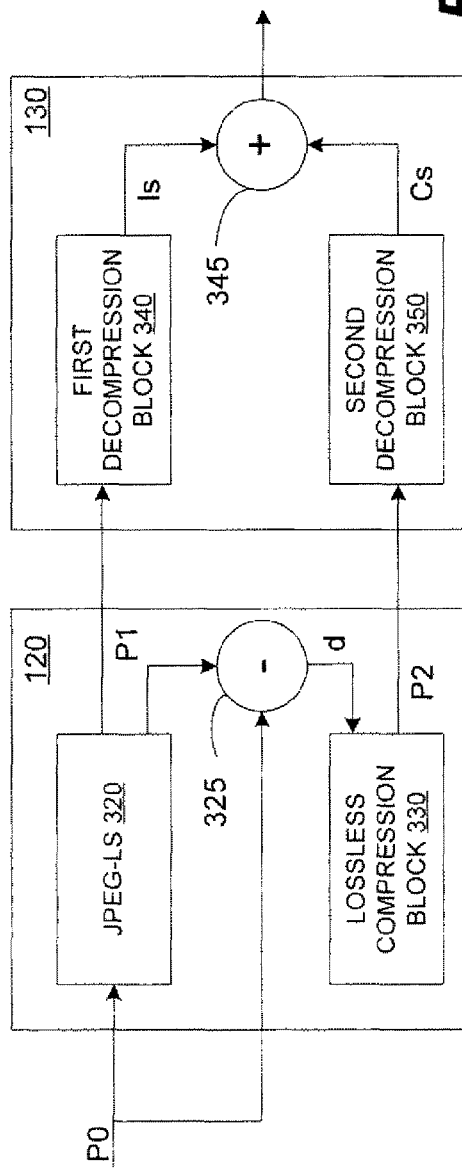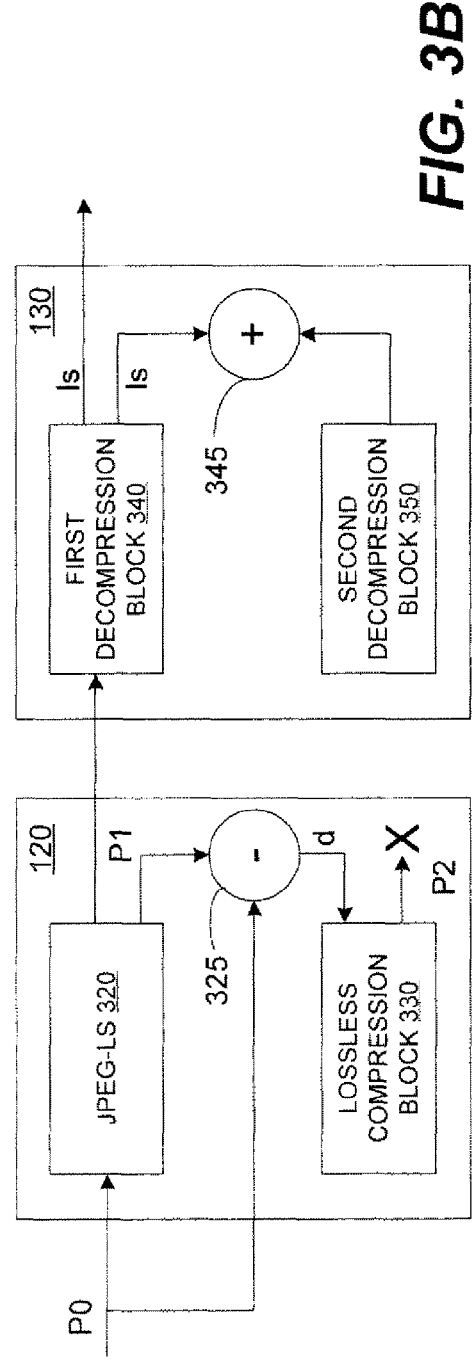

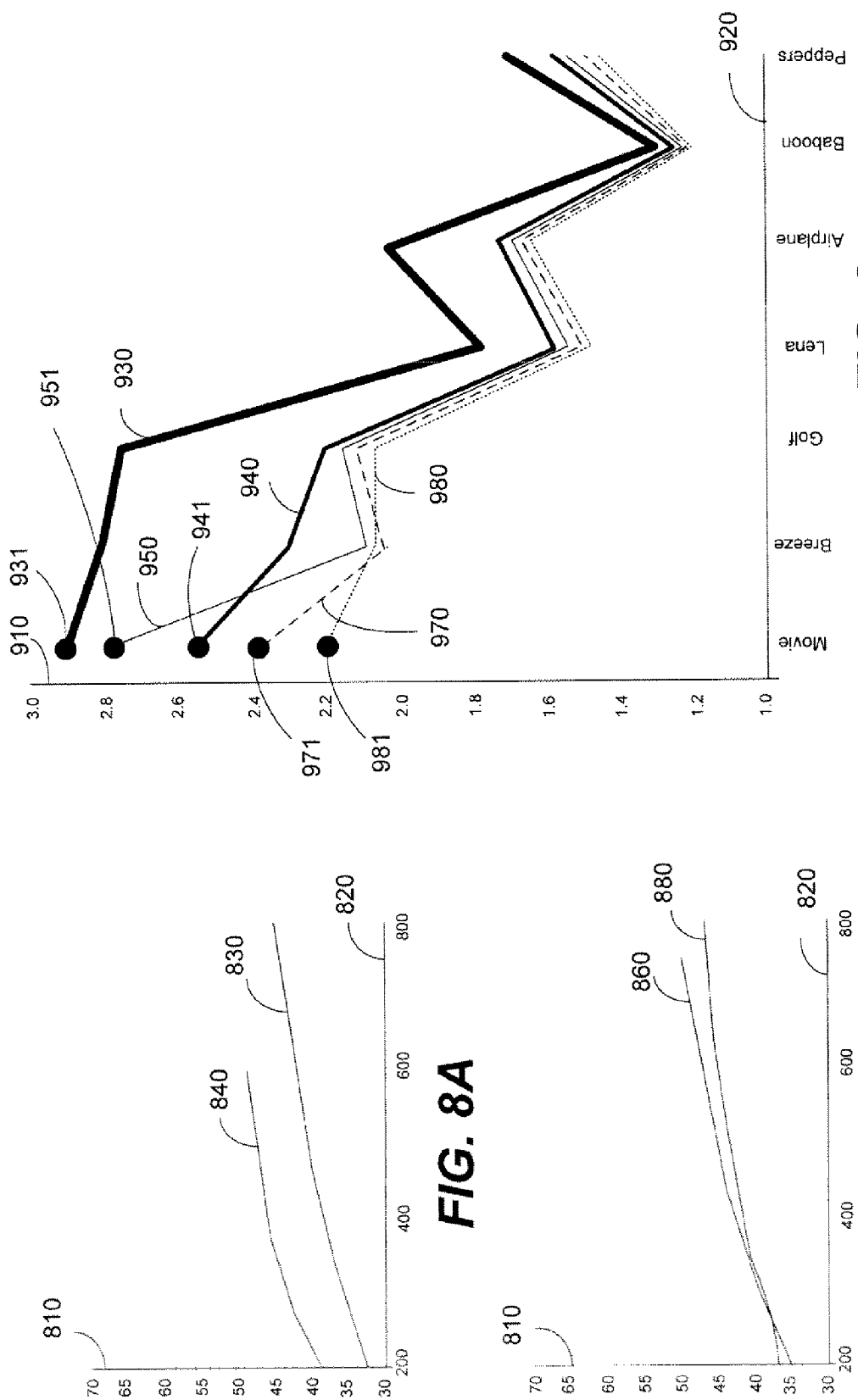

SCALABLE COMPRESSION USING JPEG-LS

BACKGROUND

A standard joint photographic experts group's (PEG) compression technique such as JPEG-LS technique provides lossless or near-lossless video and image compression for still images. The standard JPEG-LS compression techniques provide lossless compression performance, which may be substantially better compared to that of other lossless compression techniques such as JPEG-LS 2000, H.264/AVC, and CALIC. The standard JPEG-LS compression technique provides a high-quality video and image compression with low implementation complexities, and substantially good compression performance. However, the present JPEG-LS compression techniques are generally not capable of building scalable video streams and to organize multi-threaded transmission. With the advancement in the video and image processing and communication technologies, such scalable techniques may be desirable in a JPEG-LS compression technique.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a network interface card NIC 100 comprising a codec 150, which may support scalable JPEG-LS compression technique in accordance with one embodiment.

FIG. 2 is a flow-chart, which illustrates an operation performed by the codec 150 to support scalable JPEG-LS compression technique in accordance with one embodiment.

FIGS. 3A and 3B illustrate an encoding and decoding technique the codec 150 may perform to support scalable JPEG-LS compression technique in accordance with one embodiment.

FIGS. 8A and 8B illustrate rate distortion plots for standard JPEG-LS and H.263/AVS, respectively, for computer graphics and photorealistic images in accordance with one embodiment.

FIG. 9 illustrates performance graphs of the scalable JPEG-LS and standard JPEG-LS for different values of lossy factor 'n' accordance with one embodiment.

DETAILED DESCRIPTION

Figure 5:
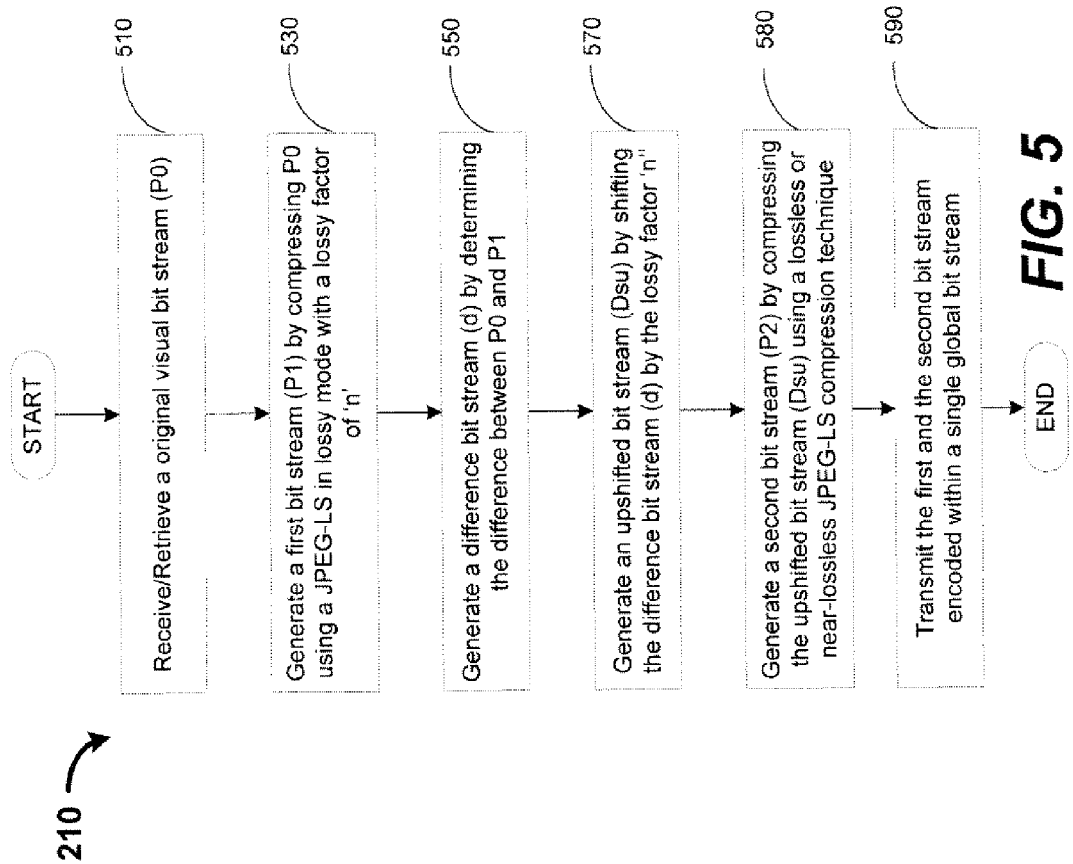
FIG. 5 is a flow-chart, which illustrates an operation that the encoder 120 is to perform to encode of an image or video using scalable JPEG-LS compression technique in accordance with one embodiment.

The following description describes a scalable JPEG-LS compression technique used to compress video and image, for example. In the following description, numerous specific details such as logic implementations, resource partitioning, or sharing, or duplication implementations, types and inter-relationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a codec may comprise an encoder and a decoder that may support scalable JPEG-LS compression and decompression technique. In one embodiment, the encoder may generate a first bit stream (P1) by compressing an original visual bit stream (P0) using a standard lossy JPEG-LS compression technique. The encoder may further generate a second bit stream (P2) by compressing the shifted version (Dsu) of the difference (d=P0−P1) of the first bit stream and the original visual bit stream. In one embodiment, the second bit stream (P2) may be generated by compressing the 'Dsu' using a lossless or near-lossless JPEG-LS compression technique. In one embodiment, the encoder may generate a single global bit stream, which may comprise the first bit stream and the second bit stream and the global bit stream may be transmitted over a stable or an un-stable communication wired or wireless communication channel. In one embodiment, a decoder may reconstruct the original visual bit stream by retrieving at least the first bit stream from the global bit stream in response to receiving the global bit stream. In one embodiment, the decoder may decompress the first bit stream using a standard JPEG-LS compression technique and then add the decompressed elements of the second bit stream, which is decoded using a lossless or near loss-less compression technique.

In one embodiment, the codec may use progressive approach to provide SNR scalability that may support features such as multi-streaming and prioritized transmission. In one embodiment, the progressive approach for providing SNR scalability may allow the decoder to receive, extract and decode a part of the global bit stream. In one embodiment, the progressive approach may provide at least two output bit streams (P1 and P2) after compression. In one embodiment, the first bit stream (P1) may provide a base quality of the reconstructed image after decoding at the receiving end. However, the second bit stream (P2) may be used to improve the quality of the reconstructed image.

For example, if the decoder generates the reconstructed image using only the first bit stream (P1) the visual quality level (42 db PSNR) may be satisfactory. However, if the decoder generates the reconstructed image using the first bit stream and the second bit stream the quality of the reconstructed image may be lose to ideal quality (i.e., reconstructed image may equal the original image). In case of a lossy transmission, the second bit may be lost and the reconstructed image may still meet the visual quality level that may be satisfactory or acceptable. In one embodiment, the JPEG-LS compression technique may include run length coding (run mode), non-linear progression (regular mode), adaptive context based statistics modeling (regular mode), Golomb entropy coding and such other similar techniques. In one embodiment, the scalable JPEG-LS compression techniques discussed above may be implemented in hardware, software, firmware or a combination thereof.

An embodiment of a network interface card NIC 100, which may support scalable JPEG-LS compression technique is illustrated in FIG. 1. In one embodiment, the NIC 100 may comprise a processing block 110, a codec 150, and a channel interface 170 coupled to a channel 180. In one embodiment, the channel 180 may comprise a wired or a wireless channel, which may be stable or un-stable. In one embodiment, while operating in transmit mode, the processing block 110 may provide video or image bit stream ('original visual bit stream', hereafter) to the codec 150. In one embodiment, the processing block 110 may store the original visual bit stream (P0) in a first portion 125-1 of the encoder buffer 125. In one embodiment, while operating in receive mode, the processing block 110 may retrieve data bits stored in the decoder buffer 135 and perform further processing before rendering visual data on a display device or storing the visual data in a display buffer of the display device.

In one embodiment, the codec 150 may comprise an encoder 120 coupled to an encoder buffer 125 and a decoder 130 coupled to a decoder buffer 135. In one embodiment, the encoder 120 may retrieve the original visual bit stream (P0) stored in the first portion 125-1 of the encoder buffer 125 and may generate a first bit stream (P1) by compressing P0 using a standard lossy JPEG-LS compression technique with a lossy factor of 'n'. In one embodiment, the encoder 120 may generate a second bit stream (P2) by compressing the up-shifted version of a difference bit stream (d=P0−P1) generated based on the difference between the original visual bit stream (P0) and the first bit stream (P1) using a lossless or near-lossless JPEG-LS compression technique. In one embodiment, the encoder 120 may bundle-up the first and the second bit stream into a single global bit stream. In one embodiment, the encoder 120 may store the global bit stream in a second portion 125-2 of the encoder buffer 125. In one embodiment, the encoder 120 may use progressive approach to provide SNR scalability.

In one embodiment, while in the transmission mode, the channel interface 170 coupled to the encoder 120 may retrieve the global bit stream from the second portion 125-2 before transmitting the global bit stream over the channel 180. In one embodiment, while in the receiving mode, the channel interface 170 coupled to the channel 180 may receive the global bit stream from the channel 180 and store the global bit stream in a second portion 135-2 of the decoder buffer 135. In one embodiment, the channel 180 may include a fluctuating wireless channel as well.

In one embodiment, the decoder 130 may retrieve at least a portion of the global bit stream that may be stored in the second portion 135-2 of the decoder buffer 135. In one embodiment, the global bit stream may be received from a transmission block (codec of a network interface card, for example) included in another system. In one embodiment, the decoder 130 may retrieve the first bit stream and the second bit stream stored in the second portion 135-2. In one embodiment, the decoder 130 may generate a first decoded bit stream/an intermediate bit stream (Is) by decoding the first bit stream using near lossless JPEG-LS compression technique. However, the intermediate bit stream may comprise distortions, which may be caused by lossy compression performed in an encoder at the transmitting end or due to the channel characteristics. In one embodiment, the decoder 130 may generate a distortion correction bit stream (Cs) by decoding the second bit stream using a lossless or near lossless JPEG-LS compression technique. In one embodiment, the decoder 130 may generate a reconstructed bit stream, which may be substantially similar to the original visual bit stream by adding the distortion correction bit stream (Cs) to the intermediate bit stream (Is). In one embodiment, the decoder 130 may store the reconstructed bit stream in a first portion 135-1 of the decoder buffer 135.

An embodiment of the operation of the codec 150, which supports a scalable JPEG-LS compression technique, is illustrated in FIG. 2. In block 210, the encoder 120 may generate a first bit stream (P1) by compressing the original visual bit stream (P0) using a standard lossy JPEG-LS with a lossy factor of 'n' and the second bit stream (P2) by using the difference bit stream (d=P0−P1) of the original visual bit stream and the first bit stream using JPEG-LS in lossless or near lossless compression mode. In block 250, the decoder 130 may generate a reconstructed bit stream using at least the first bit stream in response to receiving the global bit stream comprising the first and the second bit stream.

An embodiment of a codec 150 supporting scalable JPEG-LS compression technique while both (the first and the second bit stream) bit streams are received successfully and only the first bit stream is received successfully is, respectively, illustrated in FIGS. 3A and 3B. In FIG. 3A, in one embodiment, a standard lossy JPEG-LS block 320 with a lossy factor of 'n' may receive the original visual bit stream P0 and may generate the first bit stream P1. In one embodiment, the first bit stream P1 and the original visual bit stream P0 may be provided as a first and second input to a difference detection block 325. In one embodiment, the difference detection block 325 may generate a difference bit stream d (=P0−P1) and after up-shifting the difference bit stream 'd' by the lossy factor 'n', the up-shifted difference bit stream (Dsu) may be provided to the lossless compression block 330. In one embodiment, the lossless compression block 330 may generate the second bit stream (P2).

In one embodiment, the decoder 130 may successfully receive the first and the second bit stream and generate a reconstructed bit stream, which may be substantially similar to the original visual bit stream. In one embodiment, the first decompression block 340 may receive the first bit stream (P1) and generate a first decoded bit stream/intermediate bit stream (Is) by decompressing the first bit stream using a near lossless JPEG-LS compression technique. In one embodiment, the second compression block 350 may generate a distortion correction bit stream (Cs) in response to receiving the second bit stream. In one embodiment, the adder 345 may receive the first decoded bit stream (Is) and the distortion correction bit stream (Cs) and may generate the reconstructed bit stream, which may be of perfect quality (i.e., peak signal-to-noise ratio PSNR=$\alpha$, wherein a may represent infinity).

FIG. 3B is similar to FIG. 3A in many respects and the difference between FIG. 3A and FIG. 3B is described below. In one embodiment, the second bit stream generated by the lossless compression block 330 may not reach the decoder 130. In one embodiment, the first decompression block 340 may generate the first decoded bit stream, which may be used to generate the reconstructed bit stream. In one embodiment, the reconstructed bit stream may be used to generate the display and the displayed image or video may be of high quality (i.e., PSNR>42 db (decibels)).

Figure 4:
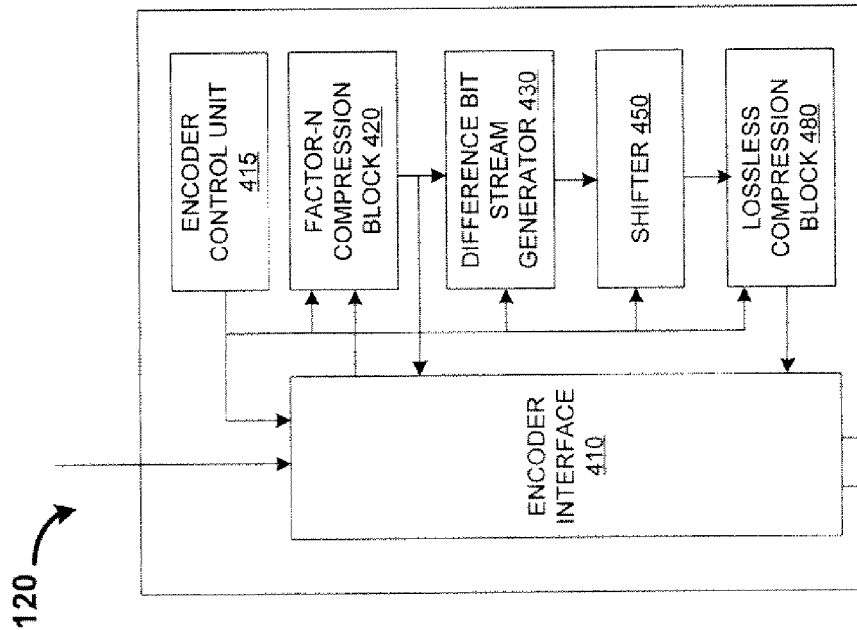
FIG. 4 illustrates an encoder 120 of the codec 110 that is to support encoding using scalable JPEG-LS compression technique in accordance with one embodiment.

An embodiment of the encoder 120 supporting scalable JPEG-LS compression technique is illustrated in FIG. 4. In one embodiment, the encoder 120 may comprise an encoder interface 410, an encoder control unit 415, a factor-n compression block 420, a difference bit stream generator 430, an up-shifter 450, and a lossless compression block 480. In one embodiment, the encoder interface 410 may support exchange of data between the encoder 120 and the processing block 110 and the channel interface block 170. In one embodiment, the encoder interface 410 may receive the original visual bit stream directly from the processing block 110 or retrieve the original visual bit stream from the first portion 125-1 of the encoder buffer 125 in response to receiving a control signal from the encoder control unit 415 as indicated in block 510.

In one embodiment, the encoder interface 410 may pass the original visual bit stream to the factor-n compression block 420. In one embodiment, the encoder interface 410 may receive the first bit stream from the factor-n compression block 420 and the second bit stream from the lossless compression block 480. In one embodiment, the encoder interface 410 may transfer the first and second bit stream to the second portion 125-2 of the encoder buffer 125 in response to receiving a second control signal from the encoder control unit 415.

In one embodiment, the encoder interface 410 may pack the first bit stream and the second bit stream into a single global bit stream such that each of the first and the second bit stream may be extracted separately at the receiving end. In one embodiment, the encoder interface 410 may perform protocol translation on the global bit stream to support multi-streaming and prioritized transmission before transmitting the global bit stream over the communication channel 180. In one embodiment, the translations may represent greater level of error protection using more robust error correction codes for the first bit stream (P1). Also, the number of retransmissions for the first bit stream (P1) may be more compared to the number of retransmissions of the second bit stream (P2). In one embodiment, the protocol translations on the global bit stream may be performed to support transmission standards such as IEEE 802.11a/b/g, IEEE 802.12.3c, and Next generation millimeter-wave specification (NGmS) for gigabit wireless transmission in wireless personal area networks (WPAN) using 60 GHz technology.

In one embodiment, in response to receiving a 'start compression' signal from the encoder control unit 415, the factor-n compression block 420 may generate a first bit stream (P1) by compressing the original visual bit stream using standard JPEG-LS compression technique with a lossy factor of n as indicated in block 530 of FIG. 5. In one embodiment, the lossy factor 'n' may equal a positive integer value such as {2, 3, 4 ... k}.

In one embodiment, in response to receiving a 'difference generate' signal from the encoder control unit 415, the difference bit stream generator 430 may generate a difference bit stream (d=P0-P1) by determining the difference between P0 and P1 as indicated in block 550. In one embodiment, the difference bit stream may comprise data that is lost by compression operation performed by the factor-n compression block 420. In one embodiment, the original visual bit stream may represent pixels of a video frame or an image, for example. In one embodiment, the size of the original visual bit stream may equal 30,000 bytes (uncompressed image of size=100×100 pixels×3 bytes/pixel in RGB representation=30,000 bytes) and the size of the first bit stream may equal 10,000 bytes (=30,000 bytes/compression ratio of 3.0). However, the compression technique with a lossy factor of 'n=2', for example may cause some of the pixel values to be discarded while compressing the original visual bit stream and the information in those discarded pixels may be lost permanently. In one embodiment, the difference bit stream (d) may comprise such pixel data that may be discarded by the factor-n compression block 420 while performing compression. In one embodiment, the difference bit stream may be determined by pixel by pixel subtraction of P1 from P0. In one embodiment, the pixel values of P0 may lie in the range (0-255) and the pixel values of P1 also lie in the range of (0-255). However, the pixel value of the difference bit stream (d) may lie in the range of (−255 to +255) and the JPEG-LS technique operates on positive pixel values. In one embodiment, the range of −255 to +255 may be converted into a positive pixel value range by up-shifting. In one embodiment, the difference bit stream (d) may be provided to the up-shifter 450.

In one embodiment, in response to receiving an 'up-shift signal' from the encoder control unit 415 and the difference bit stream from the difference bit stream generator 430, the up-shifter 450 may generate an up-shifted difference bit stream (Dsu) by up shifting the difference bit stream (d) by a factor 'n' as indicated in block 570. In one embodiment, the up-shifted difference bit stream Dsu may equal (d+n), wherein 'n' may equal 255. On up-shifting, the pixel value range may shift from (−255 to +255) to (0 to 510) and the Dsu may comprise bit stream in which 9 bits may represent a pixel and JPEG-LS may be capable of handling 9 bits/pixel representation. In one embodiment, the ideal range of value of the pixels representing the visual information lies in the range [0-255] for processing of the difference bit stream (d) using standard JPEG-LS. In one embodiment, the up-shifted difference bit stream Dsu may be provided as an input to the lossless compression block 480.

In one embodiment, in response to receiving 'a generate second stream' signal from the encoder control unit 415 and Dsu from the up-shifter 450, the lossless compression block 480 may generate the second bit stream by compressing the up-shifted bit but stream using a lossless or near lossless JPEG-LS compression technique as indicated in block 580. In the above example, the lossless compression block 480 may generate a second bit stream (P2) by compressing the up-shifted difference signal (Dsu). In one embodiment, the size of the second bit stream (P2) after compression and the size of the first bit stream (P1) after compression may provide a compression value, which may represent the total compression. In one embodiment, the encoder control unit 415 may pack the first bit stream (P1) and the second bit stream (P2) into a single global bit stream and the encoder interface 410, under the control of the encoder control unit 415, may store the global bit stream into the second portion 125-2 of the encoder buffer 125 as indicated in block 590.

Figure 6:
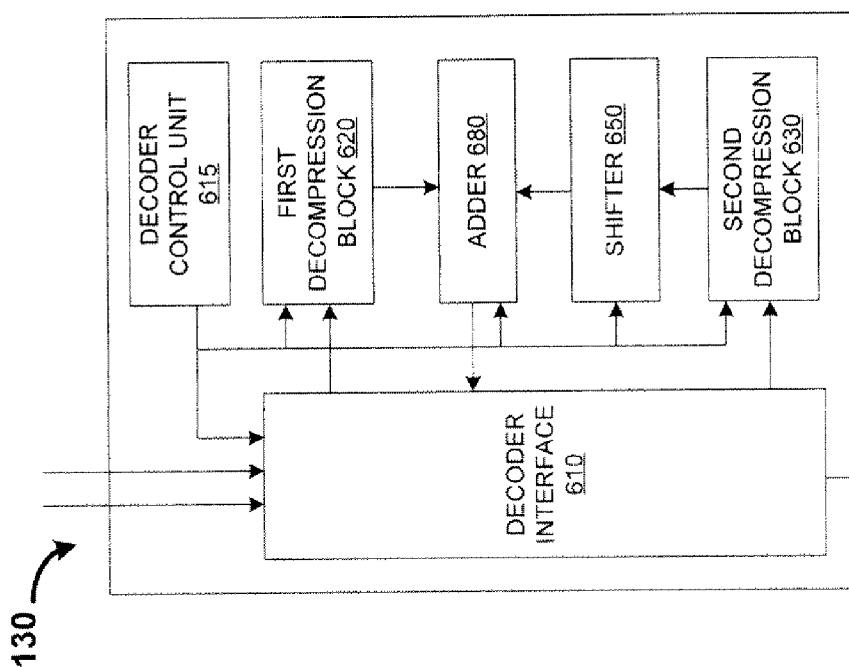
FIG. 6 illustrates a decoder 130 of the codec 150 that is to decode using scalable JPEG-LS compression technique in accordance with one embodiment.

An embodiment of the decoder 130 supporting scalable JPEG-LG compression technique is illustrated in FIG. 6. In one embodiment, the decoder 130 may comprise a decoder interface 610, a decoder control unit 615, a first decompression block 620, a second decompression block 630, a down shifter 650, and an adder 680. In one embodiment, the first compression block 620 may decompress the first bit stream and the second decompression block 630 may decompress the second bit stream and the two decompression blocks 620 and 630 are depicted separately. However, in other embodiment, a single decompression block may be provisioned to decompress the first and the second bit streams.

In one embodiment, the decoder interface 610 may support exchange of data between the decoder 130 and the processing block 110 and the channel interface block 170. In one embodiment, the decoder interface 610 may receive the global bit stream directly from the channel interface 170 or retrieve at least a portion of the global bit stream comprising the first bit stream and the second bit stream as indicated in block 710 of FIG. 7. In one embodiment, the decoder interface 610 may retrieve at least the first bit stream from the second portion 135-2 of the decoder buffer 135 in response to receiving a control signal from the decoder control unit 615.

In one embodiment, the decoder interface 610 may provide the bit streams retrieved from the global bit stream to one of the first decompression block 620 or the second decompression block 630. In one embodiment, the decoder interface 610 may retrieve at least one of the first bit stream and the second bit stream from the global bit stream and provide the first bit stream to the first decompression block 620 and the second bit stream to the second decompression block 630. In other embodiment, the decoder interface 610 may retrieve the first bit stream from the global bit stream and may provide the first bit stream to the first decompression block 620. After decoding is complete, in one embodiment, the decoder interface 610 may store the reconstructed bit stream to the first portion 135-1 of the decoder buffer 135 in response to receiving a second control signal from the decoder control unit 615.

Figure 7:
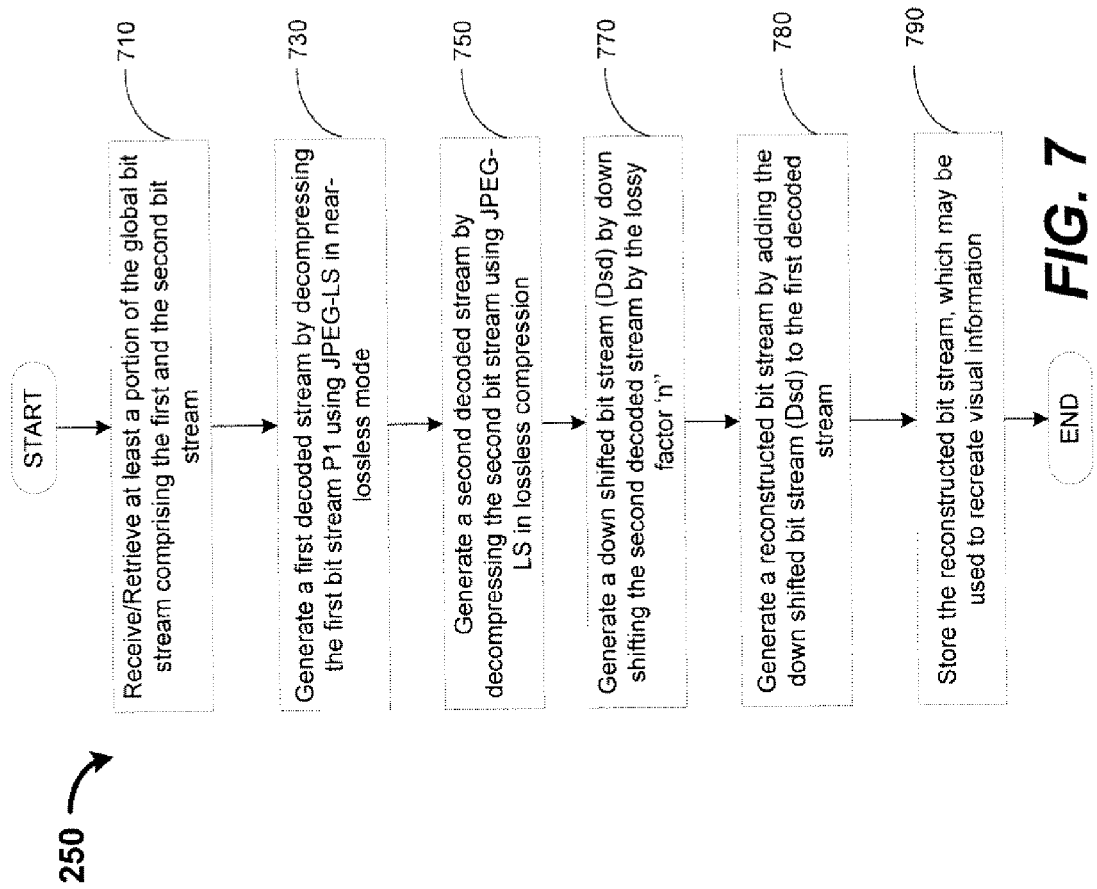
FIG. 7 is a flow-chart, which illustrates an operation that the decoder 130 is to perform while decoding an image or video using scalable JPEG-LS compression technique in accordance with one embodiment.

In one embodiment, in response to receiving 'a first start decompression' signal from the decoder control unit 615, the first decompression block 620 may generate a first decoded stream (DeS 1) by decompressing the first bit stream (P1) using JPEG-LS compression technique in a lossless or near lossless compression mode as indicated in block 730 of FIG. 7. In one embodiment, the first decoded bit stream may be generated by decompressing the first bit stream (P1).

In one embodiment, in response to receiving 'a second start decompression' signal from the decoder control unit 615, the second decompression block 630 may generate an distortion correction bit stream (Cs) by decompressing the second bit stream (P2) using JPEG-LS compression technique in a lossless or near lossless compression mode as indicated in block 750 of FIG. 7. In one embodiment, the distortion correction bit stream may be generated by decompressing the second bit stream. In one embodiment, the distortion correction bit stream (Cs) may be substantially similar to the difference bit stream generated by the difference bit stream generator 430 of FIG. 4.

In one embodiment, in response to receiving 'a down-shift' signal from the decoder control unit 615, the down shifter 650 may generate a down-shifted bit stream (Dsd) by shifting the distortion correction bit stream (Cs, which may be approximately equal to d) by a factor 'm' as indicated in block 770. In one embodiment, the down-shifted difference bit stream (Dsd) may equal (d−m). In one embodiment, the down-shifted difference bit stream (Dsd) may be provided as an input to the adder 680.

In one embodiment, in response to receiving 'a error correct' signal from the decoder control unit 615, the adder 680 may generate a reconstructed bit stream by adding the down shifted bit stream (Dsd) to the first decoded bit stream as indicated in block 780. In one embodiment, the reconstructed bit stream may be substantially similar to the original visual bit stream. As a result, the quality of the reconstructed image using the reconstructed bit stream may be almost perfect with a peak signal-to-noise ratio (PSNR) equal to alpha ($\alpha$=infinity).

In one embodiment, the decoder control unit 615 may cause the decoder interface 610 to store the reconstructed bit stream in the first portion of the decoder buffer 135-1 as indicated in block 790. In one embodiment, the processing block 110 may retrieve the reconstructed bit stream stored in the first portion of the decoder buffer 135-1 and recreate visual information using the reconstructed bit stream. In one embodiment, the recreated visual information may be substantially similar to the visual information represented by the original visual bit stream. Also, the JPEG-LS compression technique may provide a low-complexity and high compression performance.

A graph of rate distortion curves for standard JPEG-LS and H.264/AVC for computer graphics and photorealistic images is depicted, respectively, in FIG. 8A and FIG. 8B. In FIG. 8A, PSNR is plotted along the y-axis 810 and bit rate in MBps is plotted along x-axis 820. The plot 830 may represent a variation of the H.264/AVC compression technique for a bit rate variation of 200 to 800 MBps. The plot 830 depicts that the variation in PSNR is between 32.5 and 45 for a variation in the bit rate of 200 to 800 MBps. In one embodiment, the plot 840 may represent a variation of the standard JPEG-LS compression technique for a bit rate variation of 200 to 600 MBps. In one embodiment, the plot 840 depicts that the variation in PSNR is between 39 and 49 for a bit rate variation of 200 to 600 MBps. As may be readily noted, the PSNR for computer graphics in case of JPEG-LS is higher than that of the H.264/AVC compression technique.

In FIG. 8B, PSNR is plotted along the y-axis 810 and bit rate in MBps is plotted along x-axis 820. The plot 880 may represent a variation of the H.264/AVC compression technique for a bit rate variation of 200 to 800 MBps. The plot 880 depicts that the variation in PSNR is between 37.5 and 47 for a bit rate variation of 200 to 800 MBps. In one embodiment, the plot 860 may represent a variation of the standard JPEG-LS-LS compression technique for a bit rate variation of 200 to 750 MBps. In one embodiment, the plot 860 depicts that the variation in PSNR is between 35 and 50 for a bit rate variation of 200 to 750 MBps. As it may be readily noted, the PSNR for photorealistic images in case of JPEG-LS is higher than that of the H.264/AVC compression technique.

A graph of performance curves for standard JPEG-LS and scalable compression JPEG-LS for different lossy factors 'n1', 'n2', 'n3', and so on is depicted in FIG. 9. In one embodiment, the graph is plotted marking variation of compression ratio (CR) along the y-axis 910 and the test movies along the x-axis 920. In one embodiment, the plot 930 represents a variation in the compression ratio for different test movies such as movie, breeze, golf, lena, airplane, baboon, and peppers while using a standard JPEG-LS compression technique. In one embodiment, the plots 940, 950, 970, and 980 represent a variation in the compression ratio for different test movies such as movie, breeze, golf, lena, airplane, baboon, and peppers while using a scalable JPEG-LS compression technique with a lossy factor n=1, n=2, n=3, and n=4, respectively. It may be noted that the compression ratio for each of the test movies for a scalable JPEG-LS compression technique varies with the lossy factor 'n'. For example, the compression ratio for a movie for a standard JPEG-LS compression technique is 2.7 (951), 2.55 (941), 2.38 (971), and 2.2 (981) for a scalable JPEG-LS compression technique for lossy factor of n=1, 2, 3, and 4, respectively.

In one embodiment, the size (in percentage of the total) of first bit stream and the second bit stream for test movies may be provided as below;

Movie: P1=49%; Dsu=51%
Breeze: P1=45%; Dsu=55%
Golf: P1=46%; Dsu=54%
Lena: P1=59%; Dsu=41%
Airplane: P1=54%; Dsu=46%
Baboon: P1=69%; Dsu=31%
Peppers: P1=61%; Dsu=39%

Figure 10:
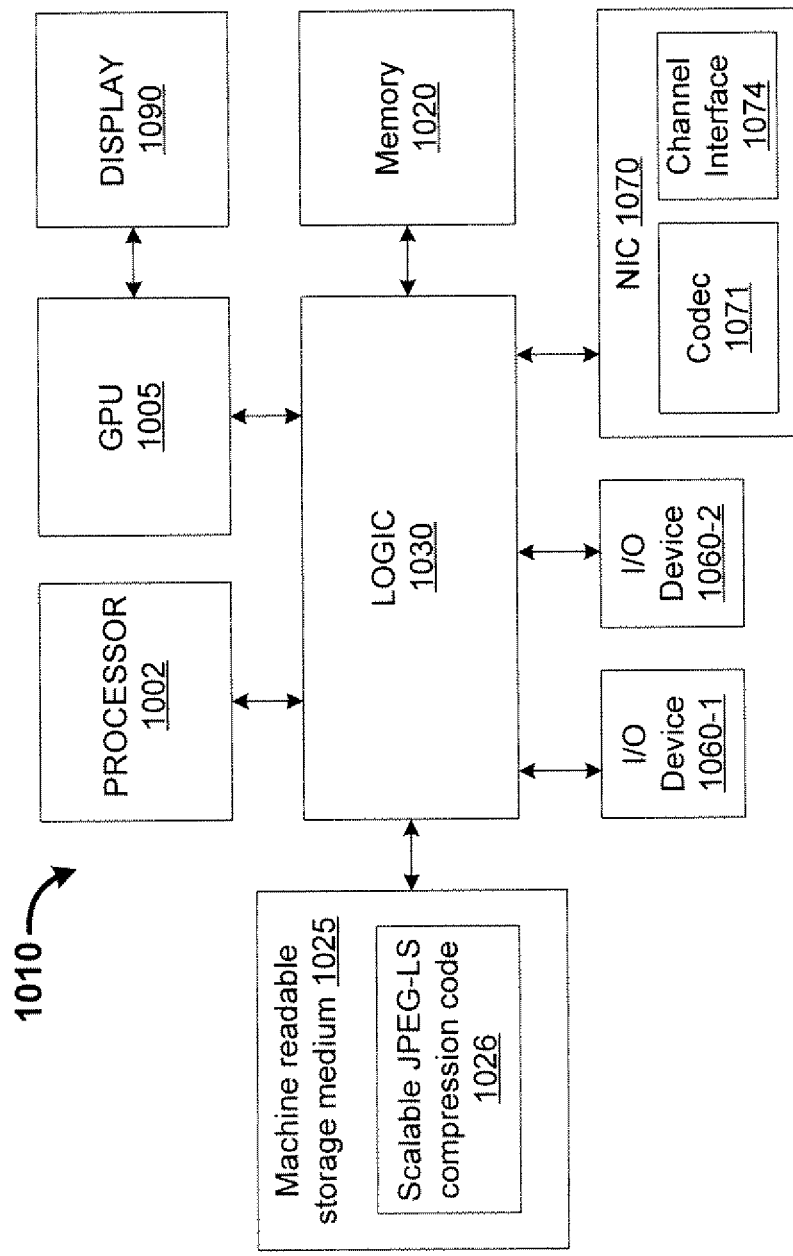
FIG. 10 illustrates a computer system supporting a network interface card 100 that may support JPEG-LS compression technique in accordance with one embodiment.

Referring to FIG. 10, a computer system 1000 may include a general purpose processor 1002 including a single instruction multiple data (SIMD) processor and a graphics processor unit (GPU) 1005. The processor 1002, in one embodiment, may support scalable JPEG-LS compression technique described above by retrieving scalable JPEG-LS compression code 1026 stored in a machine readable storage medium 1025 in addition to performing various other tasks or store a sequence of instructions, to provide enhancement operations in machine readable storage medium 1025. However, the sequence of instructions may also be stored in the memory 1020 or in any other suitable storage medium. In one embodiment, scalable the JPEG-LS compression technique described above may be supported by the processor 1002 or the GPU 1005.

While a separate graphics processor unit GPU 1005 is depicted in FIG. 10, in some embodiments, the processor 1002 may be used to perform enhancement operations, as another example. The processor 1002 that operates the computer system 1000 may be one or more processor cores coupled to logic 1030. The logic 1030 may be coupled to one or more I/O devices 1060 and 1070, which may provide interface the computer system 1000. The logic 1030, for example, could be chipset logic in one embodiment. The logic 1030 is coupled to the memory 1020, which can be any kind of storage, including optical, magnetic, or semiconductor storage. The graphics processor unit 1005 is coupled through a frame buffer to a display 1040 that may store the contents of the buffers in the codec 1071.

The scalable JPEG-LS techniques described herein may be implemented in various hardware architectures. In one embodiment, the scalable JPEG-LS compression technique may be implemented using an encoder-decoder combination in a codec 1071. In one embodiment, while the NIC 1070 is in transmit mode, the codec 1071 may generate the first and the second bit streams using the original visual bit stream generated by either the CPU 1002 or the GPU 1005 and provide the global bit stream comprising the first and the second bit stream to the channel interface 1074. In one embodiment, while the NIC 1070 is in receive mode, the codec 1071 may generate the first decoded bit stream and/or the distortion correction bit stream using at least a portion of the global bit stream received from the channel interface 1074. In one embodiment, the codec 1071 may generate the reconstructed bit stream using the first decoded and/or the distortion correction bit stream. For example, the scalable JPEG-LS compression techniques may be integrated within the logic 1030. Alternatively, a discrete or integrated graphics processor may be used. As still another embodiment, the scalable JPEG-LS compression techniques may be implemented by a general purpose processor, including a multi-core processor or as a set of software instructions stored in a machine readable medium.

In one embodiment, the computer system 1000 may represent a desktop computer system, a laptop computer system, a camera system, a cell phone, a mobile internet device (MID), a netbook, a personal digital assistant (PDA), or any other such similar system. In one embodiment, the computer system 1000 may support software based applications that may use scalable JPEG-LS compression techniques.

What is claimed is:

1. A method comprising:
    compressing a first visual bit stream, wherein the compressing includes
        receiving the first visual bit stream;
        compressing the first visual bit stream using a lossy JPEG-LS compression technique to create a first compressed bit stream, wherein the lossy JPEG compression technique has a lossy factor;
        determining a difference between the first visual bit stream and the first compressed bit stream to create a first difference bit stream;
        compressing the first difference bit stream using a lossless JPEG-LS compression technique to create a second compressed bit stream; and
        generating a first global bit stream comprising at least the first compressed bit stream and the second compressed bit stream; and
    recreating a second visual bit stream, wherein the recreating includes
        receiving a second global bit stream;
        extracting a third compressed bit stream from the second global bit stream, wherein the third compressed bit stream is a compressed version of the second visual bit stream that was compressed using a lossy JPEG-LS compression technique; and
        decompressing the third compressed bit stream using a lossless JPEG-LS compression technique to create a first decompressed bit stream.

2. The method of claim 1, wherein the compressing the first visual bit stream further includes upshifting the difference bit stream by the lossy factor, and wherein the compressing the difference bit stream includes compressing the upshifted difference bit stream using the lossless JPEG-LS compression technique.

3. The method of claim 1, wherein the compressing the first visual bit stream further includes transmitting the first global bit stream over a communication channel.

4. The method of claim 3, wherein the compressing the first visual bit stream further includes translating the first global bit stream to support multi-streaming and prioritized transmission.

5. The method of claim 1, wherein the first decompressed bit stream is a recreated second visual bit stream.

6. The method of claim 1, wherein the recreating the second visual bit stream further includes extracting a fourth compressed bit stream from the second global bit stream, wherein the fourth compressed bit stream is a compressed version of a second difference bit stream that was compressed using a lossless JPEG-LS compression technique, wherein the second difference bit stream is difference between the second visual bit stream and the third compressed bit stream;

decompressing the fourth compressed bit stream using a lossless JPEG-LS compression technique to create a second decompressed bit stream; and adding the first decompressed bit stream and the second decompressed bit stream to generate a recreated second visual bit stream.

7. The method of claim 1, wherein the recreating the second visual bit stream further includes downshifting the difference bit stream by the lossy factor, and wherein the decompressing the fourth compressed bit stream includes decompressing the downshifted difference bit stream using the lossless JPEG-LS compression technique.

8. A non-transitory machine-readable storage medium comprising a plurality of instructions that in response to being executed result in a processor:
compressing a first visual bit stream by:
receiving the first visual bit stream;
compressing the first visual bit stream using a lossy JPEG-LS compression technique to create a first compressed bit stream, wherein the lossy JPEG compression technique has a lossy factor;
determining a difference between the first visual bit stream and the first compressed bit stream to create a first difference bit stream;
compressing the first difference bit stream using a lossless JPEG-LS compression technique to create a second compressed bit stream; and
generating a first global bit stream comprising at least the first compressed bit stream and the second compressed bit stream; and
recreating a second visual bit stream by:
receiving a second global bit stream;
extracting a third compressed bit stream from the second global bit stream, wherein the third compressed bit stream is a compressed version of the second visual bit stream that was compressed using a lossy JPEG-LS compression technique; and
decompressing the third compressed bit stream using a lossless JPEG-LS compression technique to create a first decompressed bit stream.

9. The non-transitory machine-readable storage medium of claim 8, wherein the instructions in response to be executed further result in the processor compressing the first visual bit stream by upshifting the difference bit stream by the lossy factor, and wherein the compressing the difference bit stream includes compressing the upshifted difference bit stream using the lossless JPEG-LS compression technique.

10. The non-transitory machine-readable storage medium of claim 8, wherein the instructions in response to be executed further result in the processor compressing the first visual bit stream by transmitting the first global bit stream over a communication channel.

11. The non-transitory machine-readable storage medium of claim 10, wherein the instructions in response to be executed further result in the processor translating the first global bit stream to support multi-streaming and prioritized transmission.

12. The non-transitory machine-readable storage medium of claim 8, wherein the first decompressed bit stream is a recreated second visual bit stream.

13. The non-transitory machine-readable storage medium of claim 8, wherein the instructions in response to be executed further result in the processor recreating the second visual bit stream by
extracting a fourth compressed bit stream from the second global bit stream, wherein the fourth compressed bit stream is a compressed version of a second difference bit stream that was compressed using a lossless JPEG-LS compression technique, wherein the second difference bit stream is difference between the second visual bit stream and the third compressed bit stream;
decompressing the fourth compressed bit stream using a lossless JPEG-LS compression technique to create a second decompressed bit stream; and
adding the first decompressed bit stream and the second decompressed bit stream to generate a recreated second visual bit stream.

14. The non-transitory machine-readable storage medium of claim 8, wherein the instructions in response to be executed further result in the processor recreating the second visual bit stream by downshifting the difference bit stream by the lossy factor, wherein the decompressing the fourth compressed bit stream includes decompressing the downshifted difference bit stream using the lossless JPEG-LS compression technique.

15. An apparatus comprising:
a communication channel to provide external communications;
an encoder to
receive a first visual bit stream;
compress the first visual bit stream using a lossy JPEG-LS compression technique to create a first compressed bit stream, wherein the lossy JPEG compression technique has a lossy factor;
determine a difference between the first visual bit stream and the first compressed bit stream to create a first difference bit stream;
compress the first difference bit stream using a lossless JPEG-LS compression technique to create a second compressed bit stream; and
generate a first global bit stream comprising at least the first compressed bit stream and the second compressed bit stream; and
a decoder to
receive a second global bit stream;
extract a third compressed bit stream from the second global bit stream, wherein the third compressed bit stream is a compressed version of the second visual bit stream that was compressed using a lossy JPEG-LS compression technique; and
decompress the third compressed bit stream using a lossless JPEG-LS compression technique to create a first decompressed bit stream.

16. The apparatus of claim 15, wherein the encoder is further to
upshift the difference bit stream by the lossy factor; and
compress the upshifted difference bit stream using the lossless JPEG-LS compression technique.

17. The apparatus of claim 15, wherein the encoder is further to transmit the first global bit stream via the communication channel.

18. The apparatus of claim 17, wherein the encoder is further to translate the first global bit stream to support multi-streaming and prioritized transmission.

19. The apparatus of claim 15, wherein the first decompressed bit stream is a recreated second visual bit stream.

20. The apparatus of claim 15, wherein the decoder is further to
- extract a fourth compressed bit stream from the second global bit stream, wherein the fourth compressed bit stream is a compressed version of a second difference bit stream that was compressed using a lossless JPEG-LS compression technique, wherein the second difference bit stream is difference between the second visual bit stream and the third compressed bit stream;
- decompress the fourth compressed bit stream using a lossless JPEG-LS compression technique to create a second decompressed bit stream; and
- add the first decompressed bit stream and the second decompressed bit stream to generate a recreated second visual bit stream.

21. The apparatus of claim 15, wherein the decoder is further to
- downshift the difference bit stream by the lossy factor; and
- decompress the downshifted difference bit stream using the lossless JPEG-LS compression technique.

\* \* \* \* \*